No. 731,219. PATENTED JUNE 16, 1903.
E. G. & A. E. QUICKEL.
WEEDER.
APPLICATION FILED AUG. 15, 1902.
NO MODEL.
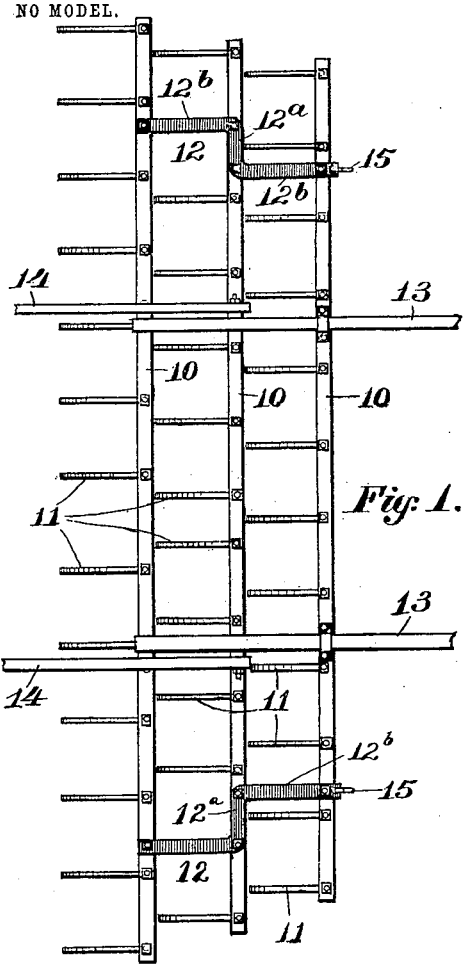
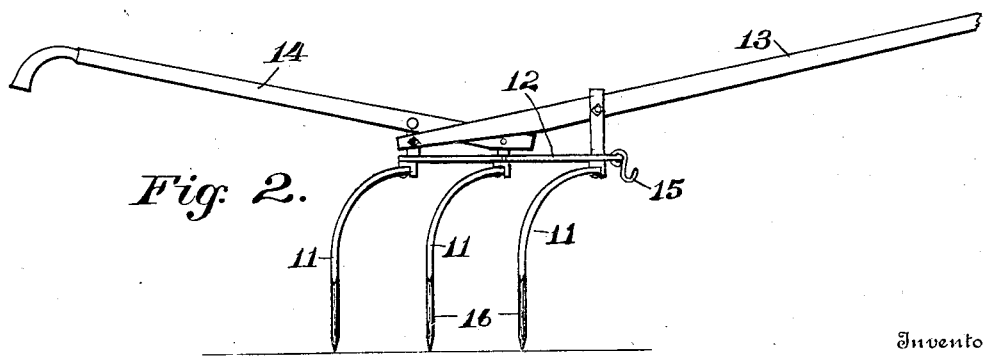

No. 731,219. Patented June 16, 1903.

UNITED STATES PATENT OFFICE.

EDWIN G. QUICKEL AND ALLEN E. QUICKEL, OF YORK, PENNSYLVANIA.

WEEDER.

SPECIFICATION forming part of Letters Patent No. 731,219, dated June 16, 1903.

Application filed August 15, 1902. Serial No. 119,800. (No model.)

*To all whom it may concern:*

Be it known that we, EDWIN G. QUICKEL and ALLEN E. QUICKEL, citizens of the United States, residing at York, in the county of York, State of Pennsylvania, have invented certain new and useful Improvements in Weeders, of which the following is a specification.

This invention comprises improvements in farming implements commonly known as "weeders," which improvements will be described in detail in the following specification, reference being had to the accompanying drawings, in which—

Figure 1 is a plan view of a weeder embodying the invention, parts being broken away; and Fig. 2 is a side elevation.

The weeder illustrated comprises three parallel angle-bars 10, a series of teeth 11, connected to the angle-bars, braces 12, connecting the angle-bars, shafts 13, connected to suitable brackets upon the frame, and handles 14, also connected to brackets on the frame.

The improvement constituting our invention consists in the offset braces 12, by which the parallel bars of the frame are connected. It is necessary that these bars should be rigidly connected, and one object of our invention is to provide a connecting-rod which is simple and cheap and is efficient. The offset bars 12 fulfil these conditions and also serve as draft connections to which the draft-hooks 15 may be attached. As shown, each bar 12 has a right-angled intermediate portion 12$^a$ and two end portions 12$^b$. The part 12$^a$ is connected to the middle bar at two points by suitable bolts, thus making the middle bar 10 and the braces relatively immovable. The front and rear bars 10 are connected by suitable bolts or rivets to the front and rear arms 12$^b$ of the braces 12, as shown in Fig. 1. The longitudinal bars and the transverse braces 12 thus form a rigidly-connected frame to which the teeth are attached.

We are aware that it has heretofore been proposed to brace weeders having three longitudinal bars with braces having curved forward ends which are connected to the front bar at two separated points. We find, however, that our brace above described is much superior to this older form of brace, for the reason that with our brace the leverage tending to disturb its connection with the middle bar is short, while in the other form of brace the leverage tending to disturb the connection with the forward bar is twice as great and the whole framework therefore only half as rigid.

It will be evident that our invention is susceptible of some modification without departing from the principle thereof. For instance, parts of the braces 12 might be arranged at acute or obtuse angles to each other instead of right angles, the essential feature being the connection of the brace to the middle frame-bar at two points, while its ends are connected to the front and rear frame bars.

Without, therefore, limiting ourselves to the precise construction and arrangement of parts illustrated and described, we claim—

1. In a weeder, the combination of a plurality of longitudinal frame-bars, teeth connected to said bars, and braces connecting said bars, each brace being connected to an intermediate bar at a plurality of separated points, for the purpose set forth.

2. In a weeder, the combination of three longitudinal frame-bars, teeth connected to said bars, and braces connecting said bars, each brace having a portion connected to the middle bar at two separated points, and branches extending to the front and rear bars and connected thereto.

3. In a weeder, the combination of longitudinal frame-bars, teeth connected to said bars, braces connecting the bars, each brace having a transverse portion united to the middle bar at two separated points, and draft connections at the forward ends of the braces.

In testimony whereof we affix our signatures in presence of two witnesses.

EDWIN G. QUICKEL.
ALLEN E. QUICKEL.

Witnesses:
ELMER C. ZIEGLER,
B. R. PAXTON.